(12) United States Patent
Park et al.

(10) Patent No.: US 12,482,850 B2
(45) Date of Patent: Nov. 25, 2025

(54) SEPARATOR SEALING DEVICE AND APPARATUS FOR MANUFACTURING UNIT CELL USING THE SAME

(71) Applicant: LG Energy Solution, Ltd., Seoul (KR)

(72) Inventors: Sung Chul Park, Daejeon (KR); Dong Hyeuk Park, Daejeon (KR); Sang Wook Kim, Daejeon (KR); Ju Hyung Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 212 days.

(21) Appl. No.: 18/011,385

(22) PCT Filed: Jul. 1, 2021

(86) PCT No.: PCT/KR2021/008331
§ 371 (c)(1),
(2) Date: Dec. 19, 2022

(87) PCT Pub. No.: WO2022/014911
PCT Pub. Date: Jan. 20, 2022

(65) Prior Publication Data
US 2023/0261241 A1 Aug. 17, 2023

(30) Foreign Application Priority Data

Jul. 17, 2020 (KR) .................. 10-2020-0089215
Feb. 24, 2021 (KR) .................. 10-2021-0025080

(51) Int. Cl.
*H01M 10/04* (2006.01)
*B29C 65/18* (2006.01)
*B32B 37/00* (2006.01)

(52) U.S. Cl.
CPC .......... *H01M 10/0404* (2013.01); *B29C 65/18* (2013.01); *B32B 37/0053* (2013.01); *B32B 2457/10* (2013.01); *Y02P 70/50* (2015.11)

(58) Field of Classification Search
CPC ..... Y02P 70/50; B32B 37/0053; B32B 41/00; B32B 41/04; H01M 10/0404;
(Continued)

(56) References Cited

U.S. PATENT DOCUMENTS 5,224,408 A * 7/1993 Steidinger ............ B26D 7/2628
83/346
2013/0244083 A1 9/2013 Min et al.
(Continued)

FOREIGN PATENT DOCUMENTS

CN 105040180 A * 11/2015
CN 110474007 A 11/2019
(Continued)

OTHER PUBLICATIONS

International Search Report for Application No. PCT/KR2021/008331 mailed Oct. 8, 2021, 2 pages.
(Continued)

*Primary Examiner* — Carson Gross
(74) *Attorney, Agent, or Firm* — Lerner David LLP (57) ABSTRACT

A separator sealing device includes: a first sealing unit provided with a sealing tip having a protruding shape to press a separator on an outer surface thereof, the first sealing unit rotating about a first rotation shaft; and a second sealing unit provided with a pressing surface that faces the sealing tip to press the separator on a circumference thereof, the second sealing unit rotating about a second rotation shaft, wherein, when the first sealing unit and the second sealing unit rotate, the sealing tip and the pressing surface press the separator disposed between the first sealing unit and the second sealing unit to perform the sealing of the separator.

18 Claims, 8 Drawing Sheets

(58) Field of Classification Search
CPC .. H01M 50/46; H01M 4/0435; H01M 4/8896; B29C 65/18; B29C 65/22; B26D 7/2614
See application file for complete search history.

(56) References Cited

U.S. PATENT DOCUMENTS

| | | |
|---|---|---|
| 2014/0363727 A1 | 12/2014 | Ko et al. |
| 2018/0254504 A1 | 9/2018 | Ko et al. |
| 2020/0153015 A1* | 5/2020 | Lee ................. B32B 37/0053 |
| 2020/0381763 A1 | 12/2020 | Ko et al. |
| 2022/0006161 A1 | 1/2022 | Kim et al. |

FOREIGN PATENT DOCUMENTS

| | | | |
|---|---|---|---|
| JP | 2013178951 A | 9/2013 | |
| JP | 2015185363 A | 10/2015 | |
| JP | 2015197977 A | 11/2015 | |
| JP | 2016103450 A | 6/2016 | |
| JP | 2016157577 A | 9/2016 | |
| KR | 20120060704 A | 6/2012 | |
| KR | 101417152 B1 | 8/2014 | |
| KR | 101595644 B1 | 2/2016 | |
| KR | 20170094713 A | 8/2017 | |
| KR | 20170138305 A | 12/2017 | |
| KR | 20180057847 A | 5/2018 | |
| KR | 102020973 B1 * | 9/2019 | |
| KR | 102029716 B1 | 10/2019 | |
| KR | 20200067575 A | 6/2020 | |
| WO | WO-2018097606 A1 * | 5/2018 | ............ H01M 10/04 |
| WO | WO-2019039102 A1 * | 2/2019 | ............ H01M 4/04 |

OTHER PUBLICATIONS

Extended European Search Report including Written Opinion for Application No. 21841846.5 dated Aug. 21, 2024, pp. 1-6.

* cited by examiner

SEPARATOR SEALING DEVICE AND APPARATUS FOR MANUFACTURING UNIT CELL USING THE SAME

CROSS-REFERENCE TO RELATED APPLICATIONS

The present application is a national phase entry under 35 U.S.C. § 371 of International Application No. PCT/KR2021/008331, filed on Jul. 1, 2021, published in Korean, which claims the benefit of the priority of Korean Patent Application Nos. 10-2020-0089215, filed on Jul. 17, 2020, and 10-2021-0025080, filed on Feb. 24, 2021, which are hereby incorporated by reference in their entirety.

TECHNICAL FIELD

The present invention relates to a separator sealing device and an apparatus for manufacturing a unit cell using the same, and more particularly, to a separator sealing device, which is capable of sealing a portion of a separator between an electrode and an electrode with accuracy, efficiency, and improved quality and capable of being used continuously and economically without problems due to deformation, and an apparatus for manufacturing a unit cell using the same.

BACKGROUND ART

As technical development and demands for mobile devices are increasing, demands for batteries as energy sources are rapidly increasing. Thus, many studies on batteries which are capable of meeting various demands have been conducted.

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

An electrode assembly or unit cell in which a positive electrode, a separator, and a negative electrode are alternately stacked may be inserted inside the secondary battery, and the separator for electrochemical cells used in the secondary battery is used as an interlayer that enables charging and discharging of the battery by continuously maintaining ionic conductivity while isolating the positive electrode from the negative electrode in the battery.

However, when the battery is exposed to a high-temperature environment due to its abnormal behavior, the separator is mechanically contracted or damaged due to its melting properties at a low temperature. In this case, the positive electrode and the negative electrode may be in contact with each other to cause ignition of the battery. In order to overcome this problem, a technology capable of suppressing the contraction of the separator and securing stability of the battery is required.

As one method for solving this problem, a form of sealing side portions of the plurality of separators so as to be attached to each other may be possible. However, since the electrode and the electrode are arranged, in the case of sealing the separator between the electrode and the electrode, there is a problem in that the sealing of the separator is not properly performed in the method according to the related art.

DISCLOSURE OF THE INVENTION

Technical Problem

The present invention is invented to solve the above problems, and an object of the present invention is to provide a separator sealing device, which is capable of sealing a portion of a separator between an electrode and an electrode with accuracy, efficiency, and improved quality and capable of being used continuously and economically without problems due to deformation, and an apparatus for manufacturing a unit cell using the same.

Technical Solution

A separator sealing device according to the present invention includes: a first sealing unit provided with a sealing tip having a protruding shape to press a separator on an outer surface thereof, the first sealing unit configured to rotate about a first rotation shaft; and a second sealing unit provided with a pressing surface that faces the sealing tip to press the separator on a circumference thereof, the second sealing unit configured to rotate about a second rotation shaft, wherein, when the first sealing unit and the second sealing unit rotate, the sealing tip and the pressing surface press the separator disposed between the first sealing unit and the second sealing unit to perform sealing of the separator.

The first sealing unit may be configured to be disposed above the separator to rotate in a first direction, the first rotation shaft may be disposed at a central portion of the first sealing unit, the second sealing unit may be configured to be disposed below the separator to rotate in a second direction opposite to the first direction, and the second rotation shaft may be disposed at a central portion of the second sealing unit.

The first sealing unit may further include; a first body having a cylindrical shape, wherein a recess is formed in a surface of the first body; a clamp block mounted in the recess; and the sealing tip mounted and fixed on the first body by the clamp block.

The sealing tip may be provided on an outer surface of the first sealing unit, and the sealing tip may include two or more sealing tips disposed at equal intervals on the outer surface of the first sealing unit.

The two or more sealing tops may include two to ten sealing tips on the outer surface of the first sealing unit.

The two or more sealing tops may include three to six sealing tips on the outer surface of the first sealing unit.

The sealing tip and the pressing surface may be configured to seal a portion of a sheet-type separator between a plurality of electrodes arranged in a longitudinal direction on the sheet-type separator.

A width of the sealing tip at a portion that is in contact with the separator may be less than a width between the plurality of electrodes.

A width of the sealing tip is 1.6 mm to 2.15 mm.

The sealing tip may include a plurality of sealing tip units spaced a predetermined distance from each other.

A spaced distance between two adjacent ones of the plurality of sealing tip units may be 0.5 mm to 10 mm.

A first rotational speed of the first sealing unit, which rotates about the first rotation shaft, may be configured to be accelerated or decelerated.

The second sealing unit may be configured to rotate about the second rotation shaft at a constant speed.

The separator sealing device may further include a frame unit on which the first sealing unit and the second sealing unit are mounted, wherein a gap measuring sensor configured to measure a gap between adjacent ones of the plurality of electrodes arranged in the longitudinal direction of the separator may be mounted on the frame unit.

The frame unit may include: a sidewall, on which opposing ends of each of the first sealing unit and the second sealing unit are mounted; and a bottom part configured to connect lower ends of the sidewall to each other, wherein the gap measuring sensor may be installed on the bottom part.

The gap measuring sensor may be configured to measure gap information between two electrodes having a boundary with a next portion to be sealed, a first rotational speed of the first sealing unit may be configured to be accelerated or decelerated while passing through a reference position that is a point spaced a predetermined distance from the boundary in a full-width direction of an electrode of the plurality of electrodes, and the first rotational speed of the first sealing unit may be configured to be accelerated or decelerated so that a center of the gap and a center of the sealing tip of the first sealing unit coincide with each other based on the reference position and the gap information.

An apparatus for manufacturing a unit cell, in which electrodes and separators are alternately stacked, according to the present invention includes: a lamination device configured to laminate an electrode stack in which a sheet-type separator and a plurality of electrodes are alternately stacked through heat and pressure; a separator sealing device configured to seal a portion between adjacent ones of the plurality of electrodes, which are arranged in a longitudinal direction of the sheet-type separator on the sheet-type separator in the electrode stack passing through the lamination device; and a cutting device configured to cut the portion between adjacent ones of the plurality of electrodes, which is sealed after the separator sealing device performs a sealing operation.

The lamination device may be configured to perform a lamination operation in a state in which a PET sheet is added to each of top and bottom surfaces of the electrode stack, and the apparatus may further include a PET sheet collection device configured to collect the PET sheet after the separator sealing device.

The apparatus may further include a both-end sealing device configured to seal opposing ends of the sheet-type separator in a width direction of the sheet-type separator, which is a direction perpendicular to a movement direction of the sheet-type separator before the cutting device performs a cutting operation.

Advantageous Effects

The separator sealing device and the apparatus for manufacturing the unit cell according to the present invention may seal the portion of the separator between the electrode and the electrode with the accuracy, efficiency, and improved quality and capable of being used continuously and economically without problems due to deformation.

MODE FOR CARRYING OUT THE INVENTION

Hereinafter, preferred embodiments of the present invention will be described in detail with reference to the accompanying drawings so that those of ordinary skill in the art can easily carry out the present invention. However, the present invention may be implemented in several different forms and is not limited or restricted by the following examples.

In order to clearly explain the present invention, detailed descriptions of portions that are irrelevant to the description or related known technologies that may unnecessarily obscure the gist of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

One Embodiment—Separator Sealing Device

Figure 1:
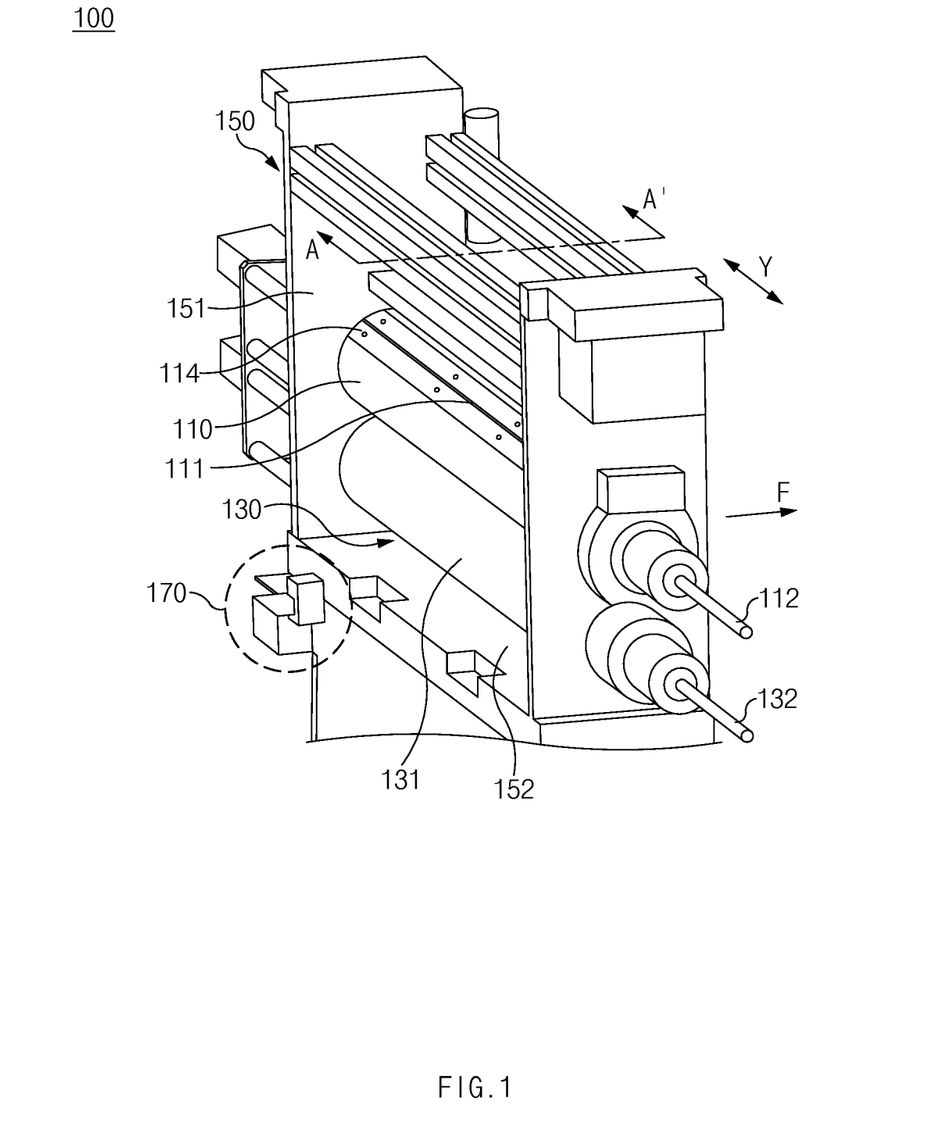
FIG. 1 is a perspective view of a separator sealing device according to an embodiment of the present invention.
Figure 2:
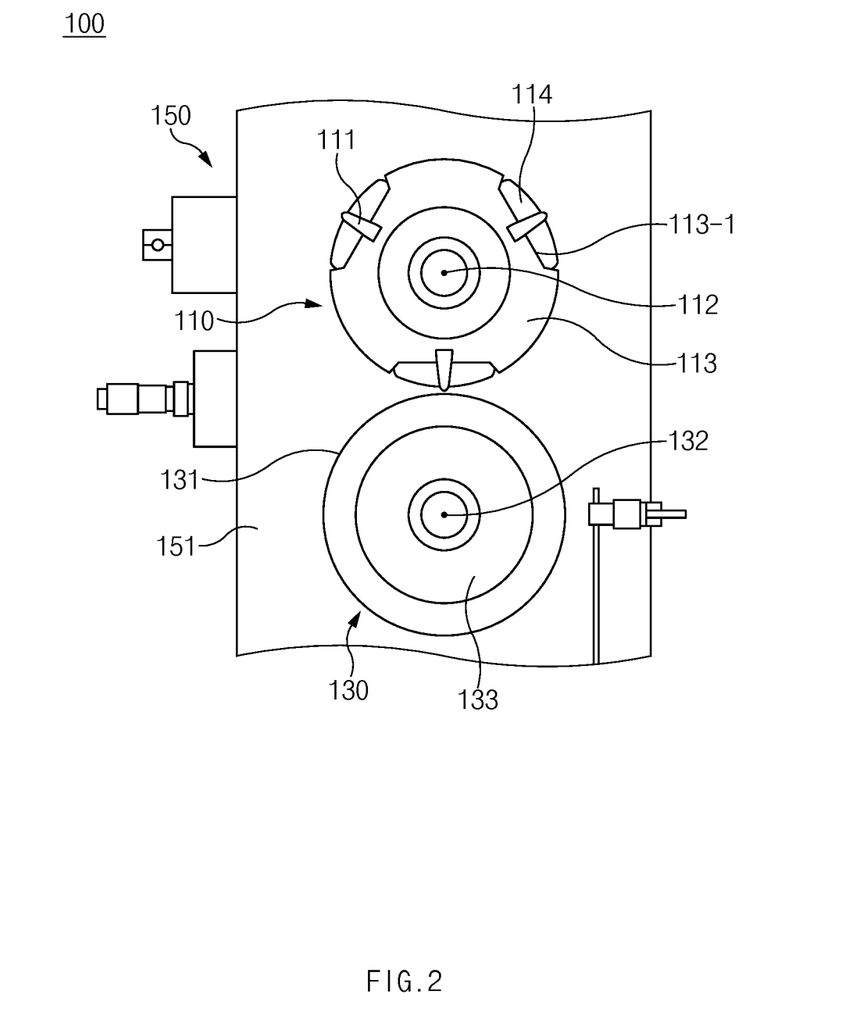
FIG. 2 is a cross-sectional view taken along line A-A' of FIG. 1.
Figure 3:
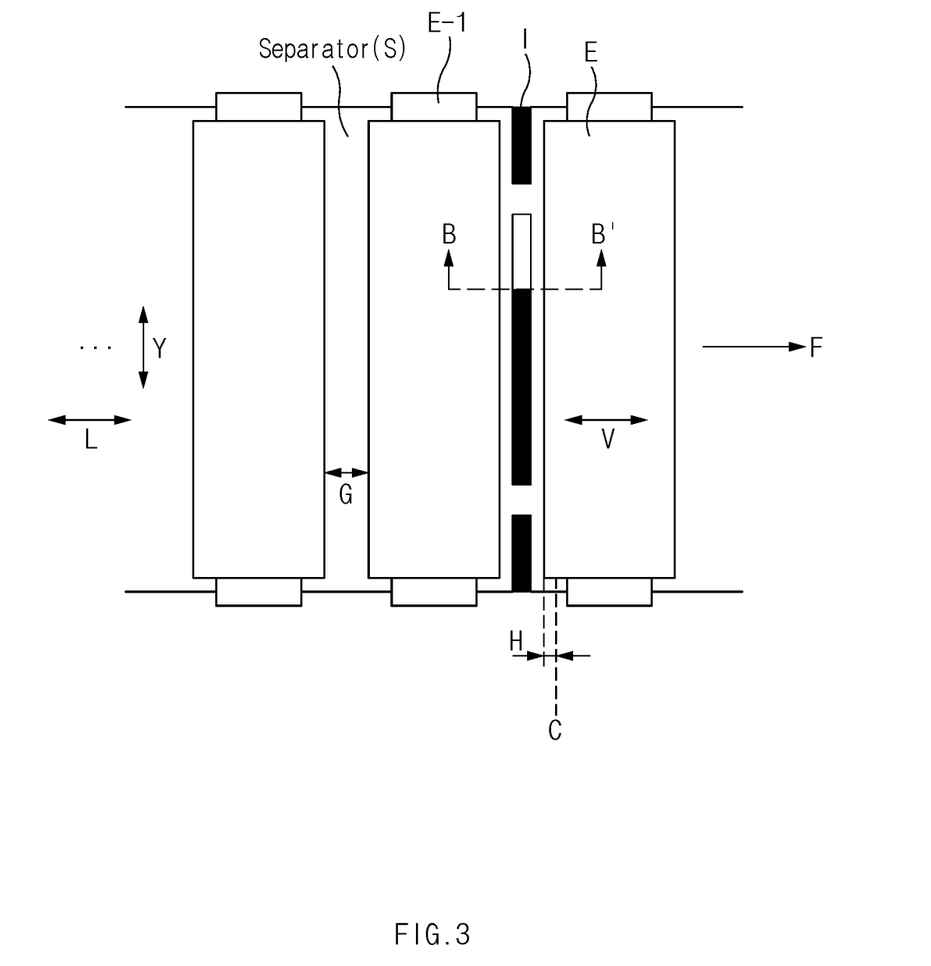
FIG. 3 is a plan view of a separator sealed by the separator sealing device according to an embodiment of the present invention.
Figure 4:
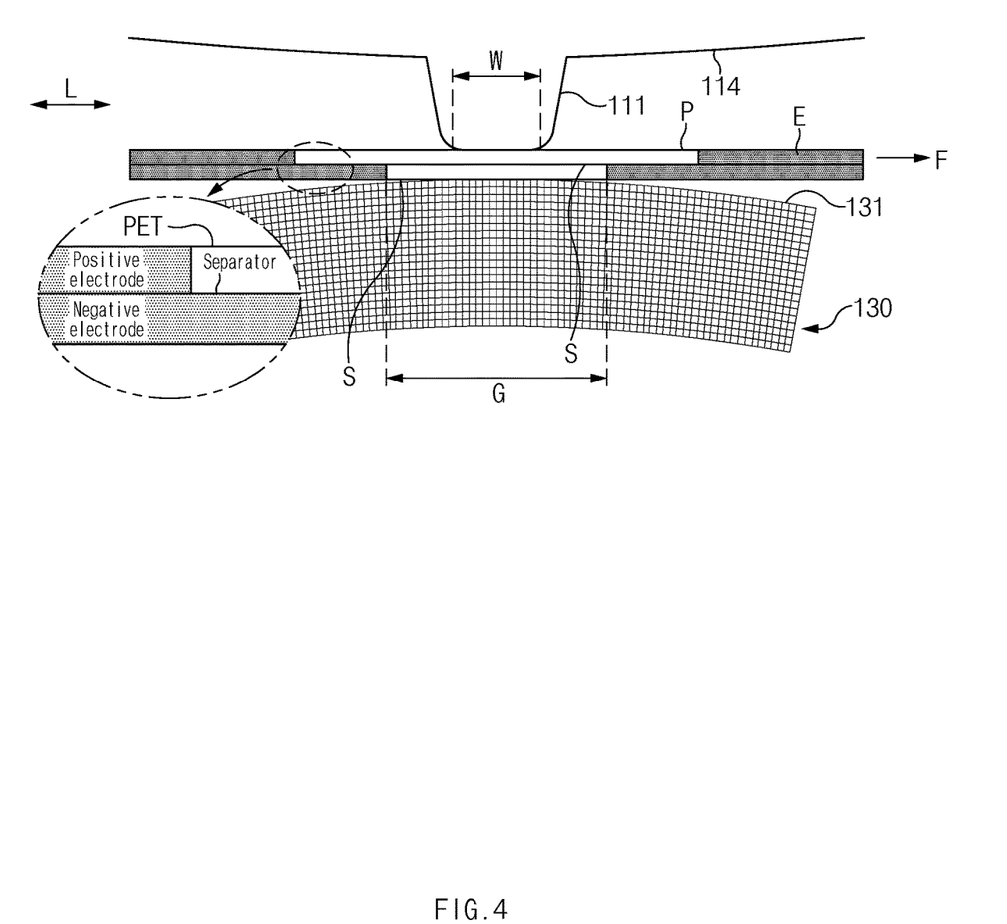
FIG. 4 is a sectional view taken along the line B-B' of FIG. 3.
Figure 5:
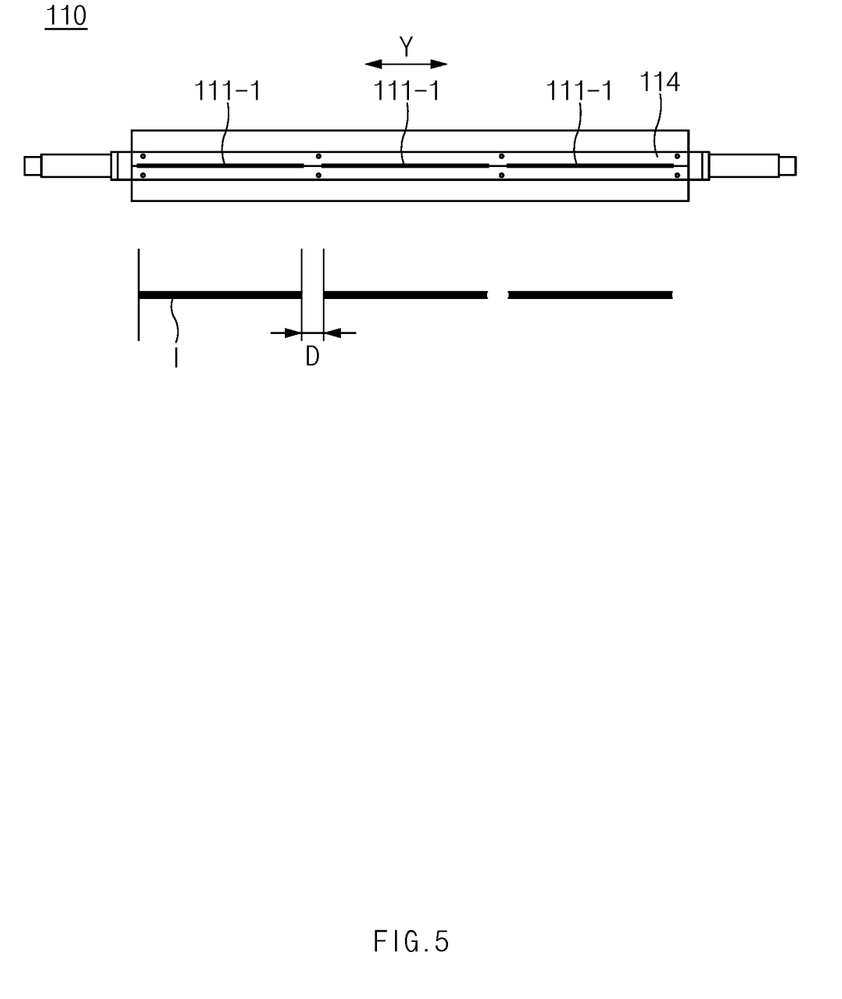
FIG. 5 is a bottom view of a sealing tip when viewed from the below in the separator sealing device according to an embodiment of the present invention.

FIG. 1 is a perspective view of a separator sealing device according to an embodiment of the present invention. FIG. 2 is a cross-sectional view taken along line A-A' of FIG. 1. FIG. 3 is a plan view of a separator sealed by the separator sealing device according to an embodiment of the present invention. FIG. 4 is a sectional view taken along the line B-B' of FIG. 3. FIG. 5 is a bottom view of a sealing tip when viewed from the below in the separator sealing device according to an embodiment of the present invention.

Referring to FIGS. 1 to 2, a separator sealing device 100 according to an embodiment of the present invention may include a first sealing unit 110 and a second sealing unit 130.

The first sealing unit 110 may be provided with a sealing tip 111 having a protruding shape to press a separator S to be sealed on an outer surface and may rotate about the first rotation shaft 112. The second sealing unit 130 may be provided with a pressing surface 131 that faces the sealing tip 111 on a circumference thereof to press the separator S to be sealed and may rotate about the second rotation shaft 132.

The first sealing unit 110 may be disposed above the separator S to rotate in a counterclockwise direction. The first rotation shaft 112 may be disposed at a central portion of the first sealing unit 110. In the same manner, the second sealing unit 130 may be disposed under the separator S to rotate in a clockwise direction, and the second rotation shaft 132 may be disposed at a central portion of the second sealing unit 130.

In the same manner, when the first sealing unit 110 and the second sealing unit 130 rotate, the sealing tip 111 and the pressing surface 131 may press the separator S disposed between the first sealing unit 110 and the second sealing unit 130 to perform the sealing of the separator.

A portion of the separator, which is disposed at a side of an electrode E in the separator stacked with the electrode E, may be fluttered or folded and may be contracted sometimes by heat. In order to solve this problem, the separators may be attached to each other by sealing the side portion of the separator with heat and pressure. However, in the case of the sealing of the side portion of the separator, there is a problem in that sealing is difficult because a width of the separator to be sealed is narrowed. Particularly, since the electrode E and the electrode E are arranged, when sealing the separator S between the electrode E and the electrode E, there is a problem in that the sealing of the separator is not properly performed through the method according to the related art.

The present invention is invented to solve this problem. Here, a sealing tip 111 of the first sealing unit 110 provided with a protruding tip may press a sealing part of the separator from the above, and the second sealing unit having a cylindrical roll shape may face the first sealing unit 110 to perform the sealing. Thus, the sealing part of the separator, which is a region having a narrow width, between the electrode E and the electrode E may be accurately and effectively sealed.

Thus, the separator sealing device 100 according to the present invention may seal the portion of the separator S between the electrode E and the electrode E with accuracy, efficiency, and improved quality.

In more detail, referring to FIG. 2, in the separator sealing device 100 according to an embodiment of the present invention, the first sealing unit 110 includes a first body 113, a clamp block 114, and a sealing tip 111. The first body 113 may have a cylindrical shape, and a recess 113-1 may be formed in a surface of the first body 113. The clamp block 114 may be mounted in the recess 113-1 to serve as a fixing and supporting part.

The sealing tip 111 may be mounted and fixed to the first body 113 by the clamp block 114. The clamp block 114 may serve to firmly support and fix the sealing tip 111. The clamp block 114 may serve to hold the sealing tip 111. Also, when the clamp block 114 is manufactured to be detachably coupled, the sealing tip 111 may be easily replaced when the sealing tip 111 needs to be replaced later.

The second sealing unit 130 may also include a second body 133 and a pressing surface 131. The pressing surface 131 may be formed on a circumferential surface of the second body 133.

The sealing tip 111 may be basically made of steel, and as another example, may be manufactured in shape in which silicone rubber covers a steel tip. Also, a Vulkollan sheet may be used instead of the silicone rubber. The Vulkollan sheet may be a polyurethane-based material having good heat conduction. Regarding the material, the second sealing unit 130 may also be manufactured in the same manner. That is, the second sealing unit 130 may be basically made of steel, and as another example, may be manufactured in shape in which silicone rubber covers a steel tip. The reason why the silicon rubber is used is for preventing possibility of damage to some separators in the process of directly impacting the steel to the separator S. In the second sealing unit 130, the Vulkollan sheet may be used instead of the silicone rubber.

Here, the sealing tip 111 is provided on an outer surface of the first sealing unit 110, and at least one or more sealing tips may be provided at equal intervals. Specifically, one or more to ten or less sealing tips 111 may be provided on the outer surface of the first sealing unit 110. More preferably, three or more to six or less sealing tips 111 may be provided on the outer surface of the first sealing unit 110.

In FIG. 2, as an example of the separator sealing device 100 according to an embodiment of the present invention, three sealing tips 111 are provided at equal intervals of 120 degrees.

A distance between the sealing tip 111 and the sealing tip 111 may be provided as a distance corresponding to a width of one electrode E. In this case, when one tip seals the sealing part between one electrode E and the electrode E, the next tip may seal the sealing part between the immediately next electrodes E. In this way, since the sealing occurs one after another in sequence, efficient sealing may be achieved.

Figure 8:
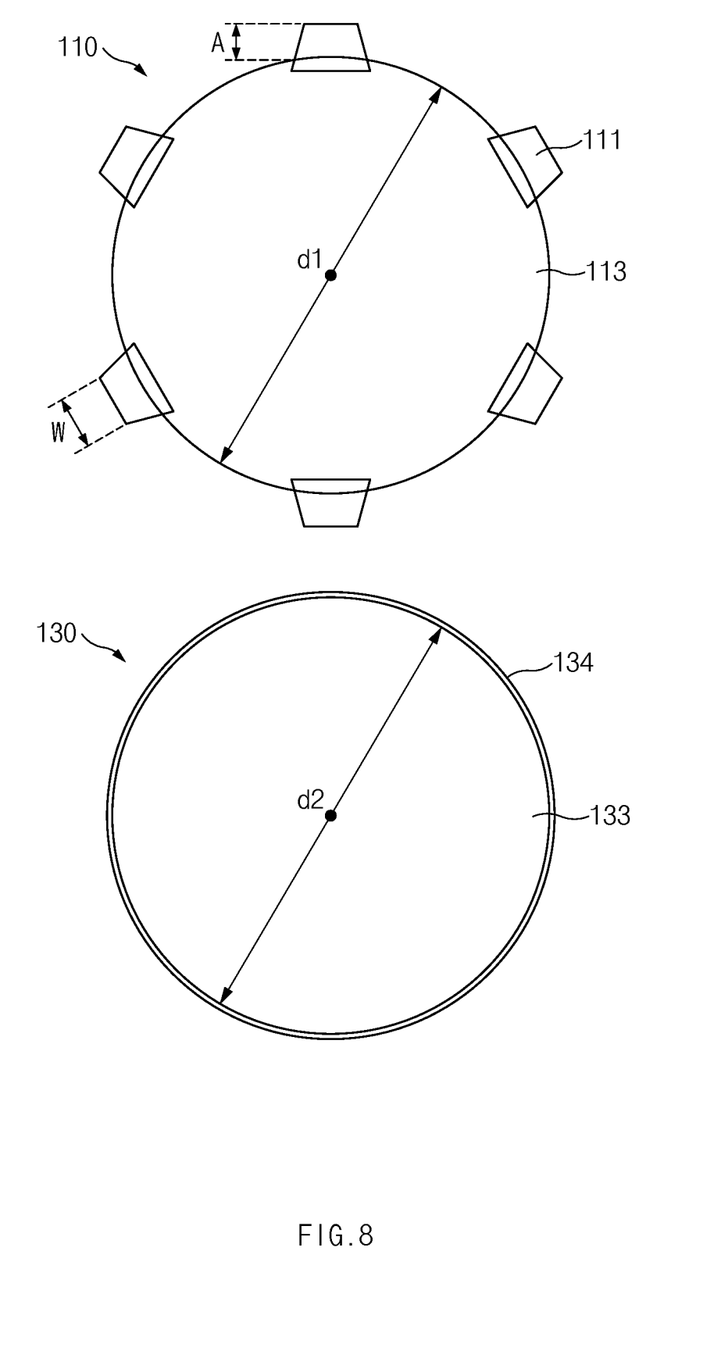
FIG. 8 is a cross-sectional view illustrating another example of the separator sealing device according to an embodiment of the present invention.

As another example of the separator sealing device 100 according to an embodiment of the present invention, six sealing tips 111 are provided on the outer surface of the first sealing unit 110, and six sealing tips may be provided at equal intervals of 60 degrees. A state in this case is illustrated in FIG. 8. When considering a size of the electrode, an interval between the electrodes, a size of the sealing unit, a transfer speed of the electrode, a rotational speed of the sealing unit, etc., experimentally, the most efficient results may be obtained when six sealing tips 111 are provided at equal intervals of 60 degrees.

In FIG. 8, a specific embodiment of the sealing units 110 and 130, in which the most efficient results are experimentally derived in the case of six sealing tips 111, is illustrated.

Referring to FIG. 8, a diameter d1 of the first body 113 of the first sealing unit 110 may be 145 mm to 155 mm, preferably 150 mm. In this case, a material of the first body 113 may be steel.

In addition, a diameter d2 of the second body of the second sealing unit 130 may be 145 mm to 155 mm, preferably 150 mm. A material of the second body 133 may also be steel. However, an outer surface of the second body 133 may be subjected to silicone rubber coating 134 having a thickness of 4 mm to 6 mm. The thickness of the silicone rubber coating 134 may preferably be 5 mm.

For a balanced and stable operation, the diameter d1 of the first body and the diameter d2 of the second body may be the same.

The sealing tip 111 may have a height A of 12 mm to 14 mm, preferably 13 mm. A width W of the sealing tip 111 may be 1.6 mm or more and 2.15 mm or less, preferably 1.73 mm.

A heating wire may be inserted into a central portion of the body. The heating wire may be inserted to raise a temperature of the sealing tip 111.

Referring to FIGS. 2, 3, and 4, the separator S disposed between the first sealing unit 110 and the second sealing unit 130 may be a sheet-type separator and be transferred in one direction F. Also, the sealing tip 111 and the pressing surface 131 may be arranged on the sheet-type separator S in a longitudinal direction of the sheet-type separator S to seal a portion between the plurality of electrodes E.

The width W of the sealing tip 111 at a portion that is in contact with the separator S may have a size less than a size G of the width between the plurality of electrodes E. In this case, the sealing tip 111 may press only the separator without pressing the electrode E. If the sealing tip 111 presses the electrode, the electrode E may be damaged, resulting in a defective battery. Therefore, the sealing device according to the present invention may be advantageous in securing excellent quality of a product.

Specifically, referring to FIG. 4, the width W of the sealing tip 111 is 1.6 mm or more and 2.15 mm or less, and the size G of the width between the plurality of electrodes E exceeds 2.15 mm to 3.25 mm or less.

If the width W of the sealing tip 111 is less than 1.6 mm, there may be a problem that the sealing part is not divided into both sides during cutting, and if the width W of the sealing tip 111 exceeds 2.15 mm, there may be a problem that the electrode is damaged. Therefore, the width W of the sealing tip 111 may be 1.6 mm or more and 2.15 mm or less, and the size G of the width between the plurality of electrodes E may have a larger value than the width.

In the case in which the width W of the sealing tip 111 is less than 1.6 mm, the means that there is the problem in that the sealing part is not divided into both sides during the cutting may mean that a subsequent cutting operation is performed in the region between the electrode E and the electrode E, but, if the width (same as the width W) of the separator sealed by the sealing tip 111 is narrowed, the sealing part of the separator is not divided in the direction of both the electrodes, but is cut by being biased to one side even though a slight error occurs at the cut position. In this case, there may be no problem in the case of the electrode having the sealing part, but in the case, in which the electrode does not have the sealing part, a problem in which short circuit occurs due to contraction of the separator because an end of the separator is not sealed.

Also, if the width W of the sealing tip 111 exceeds 2.15 mm, the means that there is a problem in that the electrode is damaged may means that, since the width of the sealing tip 111 is too large, the end of the sealing tip 111 directly presses the electrode E, and thus the electrode E is damaged.

Referring to FIG. 5, the sealing tip 111 may extend along a width direction Y of the sheet-type separator S and include a plurality of units 111-1 of the sealing tips 111, which are spaced apart from each other. As a result, the sealing tips 111 may perform sealing I in the form of a dotted line on the separator S (see FIG. 3). In FIG. 5, three units 111-1 of the sealing tips 111 are illustrated, and accordingly, the sealing shape is shown in a dotted line shape. That is, it shows that the sealing of the separator is performed along three line segments I spaced apart from each other (i.e., sealing in the form of the dotted line). A spaced distance between the units 111-1 of the sealing tips 111 corresponds to a spaced distance D between the dotted sealing line segments. In FIG. 5, the spaced distance between the line segments is illustrated as D. In this case, the spaced distance between the units 111-1 of the sealing tips 111 is also the same as D.

If the units 111-1 of the sealing tips 111 are configured to be spaced apart from each other to perform the sealing in the form of the dotted line, various advantages may be obtained. First, when a width between the electrode E and the electrode E is narrow, it may have an advantageous shape. That is, if the units 111-1 of the sealing tips 111 have a single long shape, when it is twisted at a very small angle at one side, an error may occur at the other side by a long distance. This is done because a principle in which, even if it is twisted at only a small angle at a starting point, the twisted degree significantly increases as farther away.

In the case of the present invention, since the units 111-1 of the sealing tips 111 are spaced apart from each other by a relatively short distance, even if one unit of the sealing tip 111 is partially twisted, the remaining units 111-1 of the sealing tips 111 may have no effect. Therefore, errors are not accumulated to significantly reduce possibility of occurrence of the errors.

Next, when the units 111-1 of the sealing tips 111 are configured to be spaced apart from each other, a degree of downward drooping of the sealing tip 111 due to a load thereof may be significantly reduced. When a long bar is held at both sides, a degree of drooping downward from a center of the bar due to gravity becomes large, but when a short bar is held at both sides, a degree of drooping downward from a center of the bar due to a load thereof is small. Therefore, the frequency of occurrence of defects in the sealing tip 111 may be significantly reduced, and thus, it may be used continuously and economically without occurrence of problems due to deformation.

Also, if the units 111-1 of the sealing tips 111 are spaced apart from each other to perform the sealing in the form of the dotted line, it may be advantageous for vision inspection. This is done because there is no sealing between the dotted lines, and thus, vision distortion does not occur.

In the present invention, a spaced distance D between the units 111-1 of the sealing tips 111 may be 0.5 mm to 10 mm. When the spaced distance D is less than 0.5 mm, the spaced distance may be disappeared due to thermal expansion. That is, the units 111-1 of the sealing tips 111 may adhere each other due to the thermal expansion. In addition, when the spaced distance D is greater than 10 mm, a portion of the separator S disposed at the spaced distance may be folded to cause short circuit, which may be undesirable. That is, if the separator S is sealed to be spaced too far away from each other, a portion of the unsealed separator becomes relatively free to move, which may cause a problem.

Figure 6:
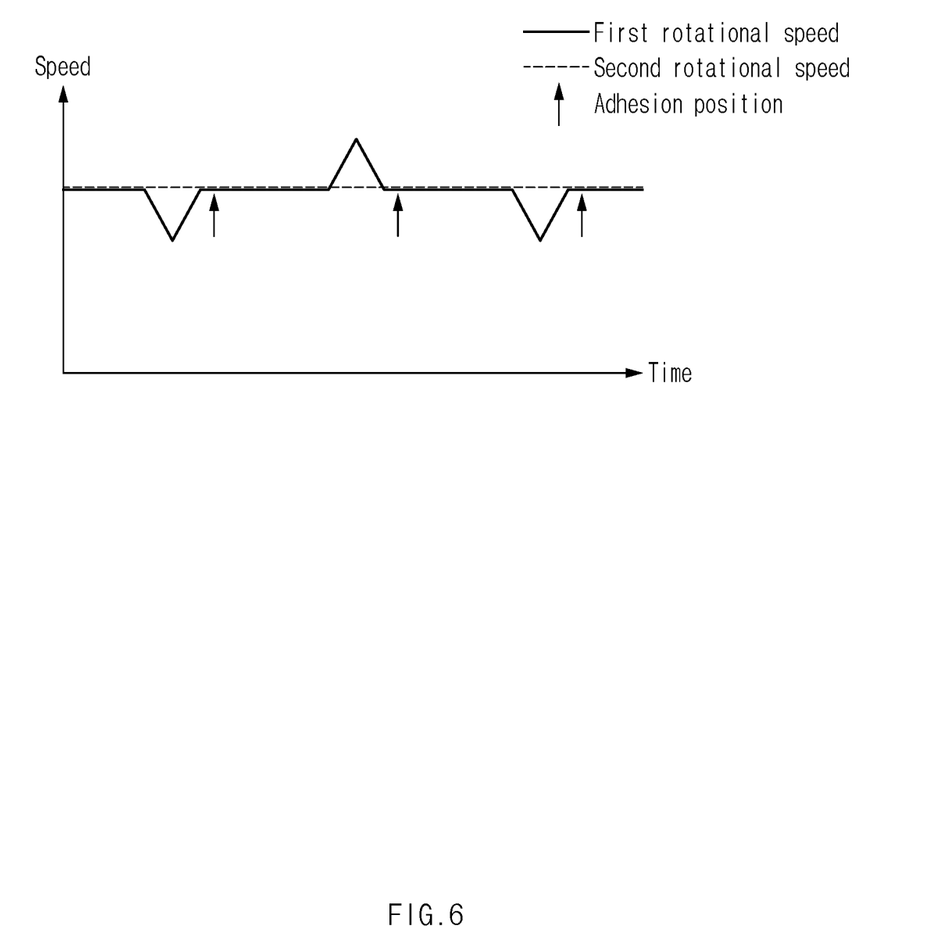
FIG. 6 is a graph illustrating a rotational speed of each of a first sealing unit and a second sealing unit.

Referring to FIGS. 3 and 6, in order to allow the sealing tip 111 to press and seal a correct position of a portion between the plurality of electrodes E arranged in a longitudinal direction L of the separator, a first rotational speed of the first sealing unit 110 rotating about the first rotation shaft 112 may be accelerated or decelerated to rotate.

In addition, the second sealing unit 130 may rotate about the second rotation shaft 132 at a constant speed. FIG. 6 is a graph illustrating a rotational speed of each of the first sealing unit 110 and the second sealing unit 130. In the graph, the first rotational speed is controlled to be decelerated slower than a rotational speed of the second sealing unit 130 after rotating at the same speed as the second sealing unit 130 and then is controlled to be accelerated faster than the rotational speed of the second sealing unit 130 and thereafter is controlled again to be decelerated slower than the rotational speed of the second sealing unit 130. Looking at the adhesion position (arrow) of the separator on the graph, it is seen that the speed is controlled just before the separator S adheres by the sealing tip 111.

Referring to FIG. 1, the separator sealing device 100 according to an embodiment of the present invention further includes a frame unit 150 on which the first sealing unit 110 and the second sealing unit 130 are mounted. In addition, a gap measuring sensor 170 that measures a gap G between the plurality of electrodes E arranged in the longitudinal direction of the separator S may be mounted on the frame unit 150.

Specifically, the frame unit 150 may include a sidewall 151, on which both ends of the first sealing unit 110 and the second sealing unit 130 are mounted, and a bottom part 152 connecting lower ends of the sidewall 151 to each other. The gap measuring sensor 170 may be installed on the bottom part 152.

Referring to FIGS. 1, 2, and 3, the gap measuring sensor 170 may measure the gap G information (gap distance) between the two electrodes E having a boundary with the next portion to be sealed. Also, the first rotational speed of the first sealing unit 110 starts to be accelerated or decelerated while passing through a reference position C that is a point spaced a predetermined distance H from the boundary in a full-width direction V of the electrode E. Here, the first rotational speed of the first sealing unit 110 may be accelerated or decelerated so that a center of the gap G and a center of the sealing tip 111 of the first sealing unit 110 coincide with each other based on the reference position C and the gap information. For further improving accuracy, a speed unit of the first sealing unit may be controlled in a unit of deg/sec, and a speed unit of the second sealing unit may be controlled in a unit of mm/sec.

As a result, it is possible to prevent the sealing tip 111 from being pressed in place. In addition, the electrode may be pressed to prevent a defect from occurring.

Another Embodiment—Apparatus for Manufacturing Unit Cell

Figure 7:
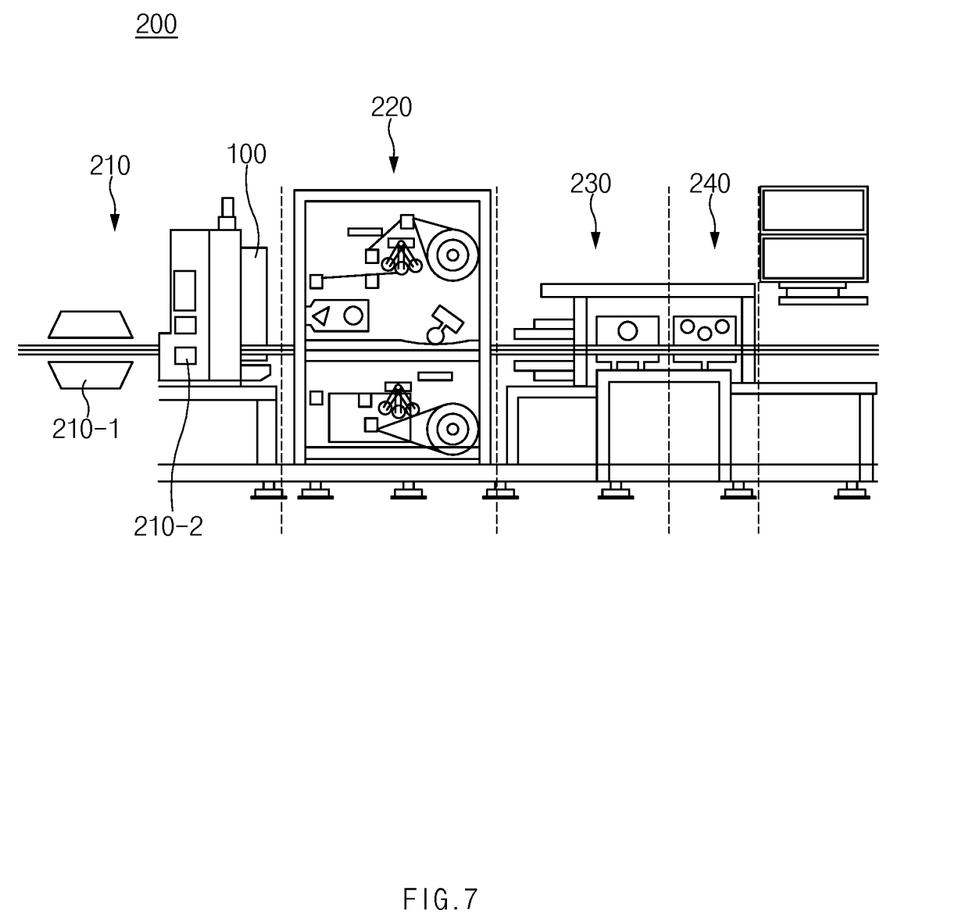
FIG. 7 is a conceptual view illustrating an apparatus for manufacturing a unit cell according to another embodiment of the present invention.

FIG. 7 is a conceptual view illustrating an apparatus 200 for manufacturing a unit cell according to another embodiment of the present invention.

Referring to FIG. 7, the apparatus 200 for manufacturing the unit cell according to another embodiment of the present invention may be an apparatus 200 for manufacturing a unit cell, in which electrodes and separators are alternately stacked.

Specifically, the apparatus 200 for manufacturing the unit cell may include a lamination device 210 that laminates an electrode stack in which a sheet-type separator and a plurality of electrodes are alternately stacked through heat and a pressure, a separator sealing device 100 that seals a portion between the plurality of electrodes, which are arranged in a longitudinal direction of the sheet-type separator on the sheet-type separator in the electrode stack passing through the lamination device 210, and a cutting device 240 that cuts the portion between the plurality of electrodes, which is sealed after the separator sealing device 100 performs the sealing operation.

Here, the lamination device 210 may include a heating unit 210-1 for heating the separator, and a lamination roller 210-2 for laminating the separator by pressing upper and lower portions of the separator.

In addition, in the apparatus 200 for manufacturing the unit cell according to the present invention, the lamination device 210 may perform a lamination operation in a state in which a PET (polyethylene terephralate) sheet P is added to each of top and bottom surfaces of the electrode stack. The separator or the electrode may be protected if the PET is added. In addition, the apparatus 200 for manufacturing the unit cell according to the present invention may further include a PET sheet collection device 220 that collects the PET sheet after the separator sealing device 100.

The reason, in which the PET sheet P is added while the separator sealing device 100 performs the sealing of the separator is because the separator is coated with a coating material having adhesion. Here, if the sealing tip 111 of the separator sealing device 100 presses the separator without the PET sheet, the sealing tip 111 may adheres to the separator. Therefore, in order to prevent this problem, the PET sheet is used. When the sealing is finished, the PET sheet may be recovered through the PET sheet collection device 220.

In addition, before the cutting device 240 performs the cutting operation, a both-end sealing device for sealing both ends of the sheet-type separator in the width direction Y of the sheet-type separator, which is a direction perpendicular to a movement direction F of the sheet-type separator 230 may be further included. That is, referring to FIG. 3, the both-end sealing device 230 may seal the separator at a portion of an electrode tab E-1, which is disposed at each of both ends in the width direction Y of the sheet-type separator.

As the most specific configuration, the apparatus 200 for manufacturing the unit cell according to the present invention may include a lamination device 210 including a heating unit 210-1 and a lamination roller 210-2, a separator sealing device 100, a PET sheet collection device 220, a both-end sealing device 230, and a cutting device 240. The unit cells manufactured after the cutting device may be transferred to a stack process.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

100: Separator sealing device
110: First sealing unit
111: Sealing tip
111-1: Unit of sealing tip
112: First rotation shaft
113: First body
113-1: Recess
114: Clamp block
130: Second sealing unit
131: Pressing surface
132: Second rotation shaft
133: Second body
134: Silicone rubber coating
150: Frame unit
151: Sidewall
152: Bottom part
170: Gap measuring sensor
200: Apparatus for manufacturing unit cell
210: Lamination device
210-1: Heating unit
210-2: Lamination roller
220: PET sheet collection device
230: Both-end sealing device
240: Cutting device
S: Separator
E: Electrode
E-1: Electrode tab
D: Spaced distance
G: Gap
C: Reference position
P: PET (polyethylene terephralate) sheet
F: One direction in which separator is transferred
L: Longitudinal direction of separator
Y: Width direction of sheet-type separator
I: Sealing in form of dotted line

The invention claimed is:
1. A separator sealing device comprising:
a first sealing unit provided with a sealing tip having a protruding shape to press a separator on an outer surface thereof, the first sealing unit configured to rotate about a first rotation shaft; and a second sealing unit provided with a pressing surface that faces the sealing tip to press the separator on a circumference thereof, the second sealing unit configured to rotate about a second rotation shaft, wherein, when the first sealing unit and the second sealing unit rotate, the sealing tip and the pressing surface press the separator disposed between the first sealing unit and the second sealing unit to perform sealing of the separator, and wherein the first sealing unit further comprises:
a first body having a cylindrical shape, wherein a recess is formed in a surface of the first body;
a clamp block mounted in the recess; and
the sealing tip having a tapered shape and being mounted and fixed on the first body by a tapered recess of the clamp block, the tapered recess accommodating the tapered shape of the sealing tip, wherein the sealing tip is disposed in a central region of the clamp block, wherein a longitudinal dimension of the sealing tip extends along the first sealing unit parallel to the first rotation shaft.

2. The separator sealing device of claim 1, wherein the first sealing unit is configured to be disposed above the separator to rotate in a first direction,
the first rotation shaft is disposed at a central portion of the first sealing unit,
the second sealing unit is configured to be disposed below the separator to rotate in a second direction opposite to the first direction, and
the second rotation shaft is disposed at a central portion of the second sealing unit.

3. The separator sealing device of claim 1, wherein the sealing tips includes two to ten sealing tips.

4. The separator sealing device of claim 1, wherein the sealing tips includes three to six sealing tips.

5. The separator sealing device of claim 1, wherein the sealing tip and the pressing surface are configured to seal a portion of a sheet-type separator between a plurality of electrodes arranged in a longitudinal direction on the sheet-type separator.

6. The separator sealing device of claim 5, wherein a width of the sealing tip at a portion that is in contact with the separator is less than a width between the plurality of electrodes.

7. The separator sealing device of claim 5, wherein a width of the sealing tip is 1.6 mm to 2.15 mm.

8. The separator sealing device of claim 5, wherein the sealing tip comprises a plurality of sealing tip units spaced a predetermined distance from each other.

9. The separator sealing device of claim 8, wherein a spaced distance between two adjacent ones of the plurality of sealing tip units is 0.5 mm to 10 mm.

10. The separator sealing device of claim 5, wherein, a first rotational speed of the first sealing unit, which rotates about the first rotation shaft, is configured to be accelerated or decelerated.

11. The separator sealing device of claim 10, wherein the second sealing unit is configured to rotate about the second rotation shaft at a constant speed.

12. The separator sealing device of claim 10, further comprising a frame unit on which the first sealing unit and the second sealing unit are mounted,
wherein a gap measuring sensor configured to measure a gap between adjacent ones of the plurality of electrodes arranged in the longitudinal direction of the separator is mounted on the frame unit.

13. The separator sealing device of claim 12, wherein the frame unit comprises:
a pair of sidewalls, on which opposing ends of each of the first sealing unit and the second sealing unit are mounted; and
a bottom part configured to connect lower ends of the pair of sidewalls to each other,
wherein the gap measuring sensor is installed on the bottom part.

14. The separator sealing device of claim 13, wherein the gap measuring sensor is configured to measure gap information between two electrodes having a boundary with a next portion to be sealed,
a first rotational speed of the first sealing unit is configured to be accelerated or decelerated while passing through a reference position that is a point spaced a predetermined distance from the boundary in a full-width direction of an electrode of the plurality of electrodes, and
the first rotational speed of the first sealing unit is configured to be accelerated or decelerated so that a center of the gap and a center of the sealing tip of the first sealing unit coincide with each other based on the reference position and the gap information.

15. An apparatus for manufacturing a unit cell, in which electrodes and separators are alternately stacked, the apparatus comprising:
a lamination device configured to laminate an electrode stack in which a sheet-type separator and a plurality of electrodes are alternately stacked through heat and pressure;
the separator sealing device of claim 1 configured to seal a portion between adjacent ones of the plurality of electrodes, which are arranged in a longitudinal direction of the sheet-type separator on the sheet-type separator in the electrode stack passing through the lamination device; and
a cutting device configured to cut the portion between adjacent ones of the plurality of electrodes, which is sealed after the separator sealing device performs a sealing operation.

16. The apparatus of claim 15, wherein the lamination device is configured to perform a lamination operation in a state in which a PET sheet is added to each of top and bottom surfaces of the electrode stack, and
wherein the apparatus is configured to collect the PET sheet after the separator sealing device.

17. The apparatus of claim 15 wherein the apparatus is configured to seal opposing ends of the sheet-type separator in a width direction of the sheet-type separator, which is a direction perpendicular to a movement direction of the sheet-type separator before the cutting device performs a cutting operation.

18. A separator sealing device comprising:
a first sealing unit provided with a sealing tip having a protruding shape to press a separator on an outer surface thereof, the first sealing unit configured to rotate about a first rotation shaft; and
a second sealing unit provided with a pressing surface that faces the sealing tip to press the separator on a circumference thereof, the second sealing unit configured to rotate about a second rotation shaft,
wherein, when the first sealing unit and the second sealing unit rotate, the sealing tip and the pressing surface press the separator disposed between the first sealing unit and the second sealing unit to perform sealing of the separator, and wherein the sealing tip is provided on an outer surface of the first sealing unit, wherein a longitudinal dimension of the sealing tip extends along the first sealing unit parallel to the first rotation shaft, wherein the sealing tip comprises two or more sealing tips spaced apart from each other at equal intervals along the longitudinal dimension.

\* \* \* \* \*